United States Patent Office 3,654,270
Patented Apr. 4, 1972

3,654,270
1-OXA-3,8-DIAZASPIRO[4,5]DECAN-2,4-DIONES
Susumu Umemoto, Sakai-shi, Akio Maki, Kyoto, and Keiji Nakamura, Neyagawa-shi, Japan, assignors to Dainippon Pharmaceutical Co., Ltd., Osaka, Japan
No Drawing. Filed June 4, 1969, Ser. No. 830,530
Int. Cl. C07d 93/14
U.S. Cl. 260—243 AA                    9 Claims

ABSTRACT OF THE DISCLOSURE 1-oxo-3,8-diazaspiro[4,5]decan-2,4-diones represented by the following formula:

$$R_1-N\underset{}{\overset{}{\bigcirc}}\underset{O-CO}{\overset{CO-N-R_2}{\diagup}}$$

which are novel chemical compounds useful as psychotropic agent with an extremely low toxicity, and to a process for the manufacture thereof.

---

This invention relates to 1-oxo-3,8-diazaspiro[4,5]decan-2,4-diones which are novel chemical compounds useful as psychotropic agent with an extremely low toxicity, and to a process for the manufacture thereof.

More specifically, this invention relates to 1-oxo-3,8-diazaspiro[4,5]decan-2,4-diones represented by the following formula:

$$R_1-N\underset{9\;10}{\overset{7\;6}{\diagup\!\!\!\diagup}}\underset{O-CO}{\overset{CO-N-R_2}{\diagup\!\!\!\diagup}} \quad (I)$$

wherein $R_1$ is a member selected from the group consisting of hydrogen; benzyl; and groups represented by the formula $$R'(CH_2)_n-$$

[in which $R'$ is a member selected from the group consisting of halogen, hydroxy, benzoyl which may be substituted by a halogen atom, preferably chlorine or fluorine, group represented by the formula $$\underset{N}{\overset{S}{\bigcirc\!\!\!\!\bigcirc}}R''$$

(in which $R''$ is a member selected from the group consisting of hydrogen, halogen, $CF_3$, lower alkoxy groups, preferably $C_1$-$C_4$ lower alkoxy groups, nitro, cyano, alkylthio having 1–4 carbon atoms, alkyl of 1–4 carbon atoms, dialkylaminosulfonyl of which alkyl portion has 1–4 carbon atoms and acetyl), a group represented by the formula $$\underset{N}{\bigcirc\!\!\!\!\bigcirc}$$

and a group represented by the formula $$\underset{N}{\bigcirc\!\!\!\!\bigcirc}$$

and $n$ is a positive integer of 2 or 3] and $R_2$ is a member selected from the group consisting of hydrogen; alkyl groups having 1 to 4 carbon atoms which may be substituted by a hydroxyl radical; phenyl which may be substituted by a halogen atom, preferably chlorine; and benzyl, and salts thereof, and to a process for the manufacture thereof.

Heretofore, as useful psychotropic agent there have been known chloropromazine compounds typified by the compound of the formula $$\underset{\underset{CH_2CH_2CH_2N\underset{CH_3}{\diagdown}CH_3}{N}}{\overset{S}{\bigcirc\!\!\!\!\bigcirc}}Cl$$

(U.S. Pat. No. 2,645,640).

The compounds of this invention are characterized by the following basic structure shown in the Formula I $$-N\underset{}{\overset{}{\bigcirc}}\underset{O-CO}{\overset{CO-N-}{\diagup}}$$

and are novel compounds which are quite different from the above mentioned known compounds with respect to the basic structure.

The compounds having the above basic structure and represented by the Formula I, except those where $R_1$ is a hydrogen and $R_2$ is a hydroxyalkyl group having 1 to 4 carbon atoms, can be produced by a process comprising reacting a 1-substituted-4-cyano-4-piperidinol of the formula $$R'_1-N\underset{}{\overset{}{\bigcirc}}\underset{OH}{\overset{CN}{\diagup}} \quad (IV)$$

wherein $R'_1$ has the same meaning as $R_1$ except hydrogen, with an isocyanate of the formula $$YNCO \quad (III)$$

wherein Y is a member selected from the group consisting of alkyl of 1–4 carbon atoms, phenyl which may be substituted by a halogen atom, benzyl, benzoyl and alkanoyl of which alkyl portion has 1–4 carbon atoms, preferably in a non-polar solvent, and hydrolyzing the resultant intermediate of the formula $$\left[R'_1-N\underset{}{\overset{}{\bigcirc}}\underset{O-CO}{\overset{NCONHY}{\underset{\|}{C-N-Y}}}\right] \quad (II)$$

wherein $R'_1$ and Y are as defined above.

In this invention it is preferred that the reaction between the compound of the Formula IV and the Formula III is conducted in a non-polar solvent such as benzene, xylene and toluene. This reaction is allowed to advance at room temperature, but if desired, the reaction may be carried out under heating conditions. Generally, reaction temperature ranging from 0 to 150° C., preferably from 15 to 50° C. may be adapted. The reaction time is not critical in this invention, but usually the reaction is conducted for more than 3 hours and a reaction time of, for instance, 3 to 15 hours is sufficient.

It is also preferred to carry out the reaction in the presence of a catalytic amount of a tertiaryamine such as triethylamine, trimethylamine and pyridine, particularly a trialkylamine.

No specific restriction is given to the molar ratio of the reactants, but it is generally preferred to use the isocyanate of the Formula III in an amount greater than 2 moles per mole of the compound of the Formula IV. It is particularly preferred to use the isocyanate of the Formula III in an amount of 2–3 moles per mole of the compound of the Formula IV.

The compound of the Formula II is formed by the above reaction. The so formed compound of the Formula II is hydrolyzed to obtain the intended compound of the following Formula I':

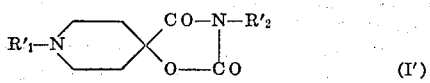
(I')

in which R'$_2$ has the same meaning as R$_2$ except hydroxyalkyl group of 1-4 carbon atoms, and R'$_1$ is as defined above.

The hydrolysis of the compound of the Formula II may be performed by heating the compound of the Formula II in the presence of a mineral acid such as diluted hydrochloric acid and diluted sulfuric acid, and, if desired an alcohol such as methanol and ethanol. It is preferred to conduct the heating under reflux.

After the hydrolysis reaction, the system is cooled and the intended compound of the Formula I' is obtained in a form of a salt of the mineral acid used in the hydrolysis such as hydrochloride or sulfate by separating and collecting the resulting precipitate by a known customary manner.

The so obtained intended compound of the Formula I' may be further purified, according to need by employing methanol, ethanol, dioxane or a mixed solvent thereof with water.

In this invention, when an acyl isocyanate where R$_2$ is a benzoyl or an alkanoyl group of which alkyl portion has 1 to 4 carbon atoms is particularly used as the reactant of the Formula III, the deacylation reaction is caused to occur during the hydrolyzing step and the compound of the Formula I' where R'$_2$ in the Formula I' is hydrogen is formed.

The above described steps for producing the compound of the Formula I' of this invention are shown as follows:

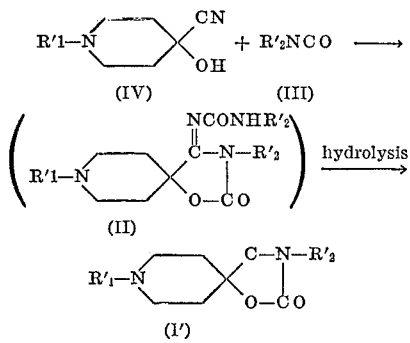

in which R'$_1$ and R'$_2$ are as defined above.

Further, in this invention a compound of the Formula I where R$_1$ is a benzyl, may be converted once to a compound where R$_1$ is a hydrogen atom, and then further converted to a compound of the Formula I wherein R$_1$ is other member fallen within the definition of R$_1$.

Still further, in this invention a compound of the Formula I where R$_2$ is a hydrogen atom may be converted to a compound of the Formula I where R$_2$ is benzyl or an alkyl group of 1-4 carbon atoms which may be substituted with a hydroxyl radical.

Accordingly, it must be noted that in this invention the process comprising the above mentioned two steps, namely the step of reacting a compound of the Formula IV and a compound of the Formula III and the step of hydrolyzing the resulting intermediate of the Formula II includes embodiments where the resulting compound of the Formula I' is further converted to another compound of the Formula I where R$_1$ and/or R$_2$ are members other than those in the originally formed compound of the Formula I'. These embodiments are described below.

(A) Conversion of a compound of the Formula I where R$_1$ is a benzyl group to a compound where R$_1$ is a hydrogen atom: This conversion may be performed by introducing hydrogen gas into the reaction system in an organic solvent inert to the compound to be reduced, such as an alcohol, dioxan and acetic acid, preferably in a substantially anhydrous solvent, in the presence of a metal reduction catalyst such as a palladium-carbon catalyst, a platinum catalyst or a nickel catalyst. The amount used of the catalyst is not particularly critical, but generally the catalyst is used in an amount of about 1-5% to the starting reactants. The reaction may be carried out under either atmospheric or elevated pressure and at either room temperature or an elevated temperature. From the operational view point it is preferred to carry out the reaction in a solvent such as acetic acid or glacial acetic under atmospheric pressure at an elevated temperature preferably ranging from room temperature to the boiling point of the solvent. In the case of acetic acid the reaction can be conveniently performed at a temperature of about 40 to 90° C. The reaction A is shown as follows:

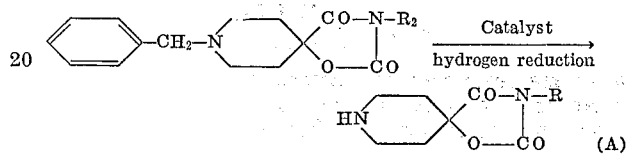
(A)

in which R$_2$ is as defined above.

(B) R$_1$ may be converted to a different R$_1$ according to the following reaction (B):

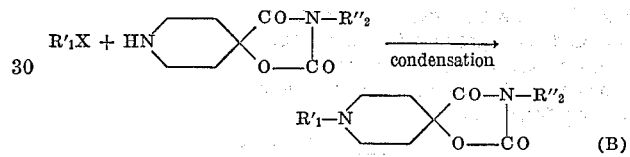
(B)

wherein X stands for a halogen atom, preferably chlorine or bromine, R'$_1$ is as defined above, R''$_2$ has the same meaning as R$_2$ except hydrogen.

The reaction (B) may be conveniently performed by heating in an organic solvent such as benzene, xylene, toluene, acetone and dimethylformamide. The reaction may be performed at a temperature above 10° C., preferably in the range of from 50 to 150° C. The reaction may be carried out under atmospheric pressure, but it may be carried out also under elevated pressures, if desired. No particular restriction is given to the reaction time, but it is general to carry out the reaction for 1 to 20 hours.

In conducting the above reaction it is preferred to employ a hydrogen halide acceptor such as sodium carbonate, potassium carbonate and triethylamine. In this case the reaction is allowed to advance more smoothly by adding a catalytic amount of potassium iodide or sodium iodide to the reaction system.

In the above reaction the molar ratio of the reactants may be optionally changed, but it is preferred that the compound of the Formula I where R$_1$ is hydrogen is used in an equimolar amount in the case of using a hydrogen halide acceptor or in an amount of more than 2 moles per mole of R'$_1$X in the case of not using a hydrogen halide acceptor. It is also possible to use the compound of the Formula I where R$_1$ is hydrogen in such an excessive amount as 2 to 3 moles per mole of R'$_1$X and make said compound of the Formula I where R$_1$ is hydrogen serve as hydrogen halide acceptor and solvent.

(C) R$_1$ may be converted to a different R$_1$ according the following reaction (C):

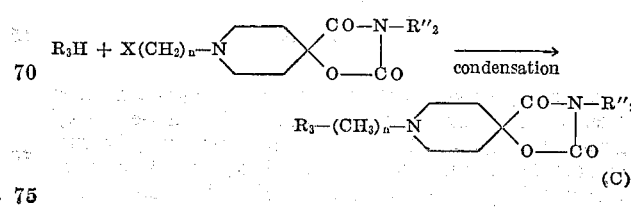
(C)

wherein X is a halogen atom, R″₂ is as defined above with respect to the Formula B, R₃ is a radical selected from the group consisting of

[structure: phenothiazine-type ring with S, N-R″, substituent R″]

in which R″ is as defined above,

[structure: acridine/carbazole-type ring with CH₂ bridge and N]

and

[structure: dihydroacridine-type ring with N]

and $n$ is a positive integer of 2 or 3.

The reaction (C) is conducted by heating the reactants in a solvent such as benzene, xylene, toluene, ether, tetrahydrofuran, dioxane, dimethylformamide and liquid ammonia in the presence of a condensing agent. The reaction temperature is above $-30°$ C., preferably in the range of $-30$ to $150°$ C. It is general to carry out the reaction for about 1 to 24 hours. The molar ratio of the reactants is generally about equimolar. As preferable condensing agent there are cited sodium hydride, sodium amide, butyl lithium and phenyl lithium. The amount used of such condensing agent ranges from 1 to 2 moles to the reactants.

The compound of the above mentioned formula $$X(CH_2)_n-N\begin{pmatrix} CO-N-R''_2 \\ O-CO \end{pmatrix}$$

used in the reaction (C) may be prepared from a compound of the Formula I where R₁ is a hydrogen atom according to the following reaction $$X(CH_2)_nX' + H-N\begin{pmatrix} CO-N-R''_2 \\ O-CO \end{pmatrix} \xrightarrow{condensation}$$

$$X(CH_2)_n-N\begin{pmatrix} CO-N-R''_2 \\ O-CO \end{pmatrix}$$

wherein X and X′ are each a halogen atom, preferably X being chlorine and X′ being bromine, $n$ is a positive integer of 2 or 3 and R″ is as defined above with respect to the Formula B.

(D) R₁ may be converted to a different R₁ according to the following reaction (D):

$$R_4COCl + HO(CH_2)_n-N\begin{pmatrix} CO-N-R'''_2 \\ O-CO \end{pmatrix} \xrightarrow{condensation}$$

$$R_4COO(CH_2)_n-N\begin{pmatrix} CO-N-R'''_2 \\ O-CO \end{pmatrix} \xrightarrow{decarboxylation}$$

$$R_4(CH_2)_n-N\begin{pmatrix} CO-N-R' \\ O-CO \end{pmatrix}$$

(D)

wherein R‴₂ has the same meaning as R₂ except hydrogen and a hydroxyalkyl group having 1–4 carbon atoms, and $n$ is as defined above with respect to the Formula B and R₄ is a group represented by the formula

[structure: phenothiazine ring system with S, N, and R″]

in which R″ is as defined above.

The compound of the above mentioned formula $$HO(CH_2)_n-N\begin{pmatrix} CO-N-R'''_2 \\ O-CO \end{pmatrix}$$

used in the reaction (D) may be prepared from a compound of the Formula I where R₁ is a hydrogen atom by the above mention method (B).

The reaction (D) is performed by subjecting R₄COCl and $$HO(CH_2)_n-N\begin{pmatrix} CO-N-R'''_2 \\ O-CO \end{pmatrix}$$

to dehydrochlorination in a solvent and then heating the resulting reaction product in the presence or absence of a solvent under reduced pressure to thereby cause decarboxylation.

As preferable solvent usable in the above dehydrochlorination there are cited inert organic solvents such as methylethylketone, isopropylacetone, toluene and xylene. As preferable solvent usable in the above decarboxylation there are cited 1,3-dimethyloxybenzene and tetraline.

The dehydrochlorination reaction is carried out under heating at about 50 to 150° C. for about 5 to 24 hours.

The decarboxylation is preferably carried out under reduced pressure, especially under highly reduced pressure. For instance, the decarboxylation is conducted under a pressure of below 5 mm. Hg generally in the range of 0.1 to 1 mm. Hg. In this case it is preferred to carry out the reaction at elevated temperatures. For instance, the reaction is allowed to advance conveniently at a temperature in the range of from 170 to 230° C. When this decarboxylation reaction is conducted in the presence of powder of copper metal at an elevated temperature under reduced pressure, the reaction is allowed to advance very smoothly.

(E) R₁ may be converted to a different R₁ according to the following reaction (Mannich reaction) (E):

$$Y-\langle\phantom{xx}\rangle-COCH_3 + (HCHO)_m +$$

$$H-N\begin{pmatrix} CO-N-R_2 \\ O-CO \end{pmatrix} \xrightarrow{Mannich\ reaction}$$

$$Y-\langle\phantom{xx}\rangle-CO(CH_2)_2-N\begin{pmatrix} CO-N-R_2 \\ O-CO \end{pmatrix} \quad (E)$$

wherein Y is a halogen, or hydrogen atom, (HCHO)ₘ is formaldehyde or paraformaldehyde, and R₂ is as defined above with respect to the Formula I.

The reaction (E) among an acetophenone in which the phenyl group may be substituted by a halogen atom such as p-chloroacetophenone, formaldehyde or paraformaldehyde and a compound of the Formula I where R₁ is a hydrogen atom may be preferably performed in the presence of hydrochloric acid in an inert organic solvent such as alcohols, for instance, ethanol and propanol. The reaction is generally conducted at 50 to 100° C. under atmospheric pressure for 3 to 10 hours.

In case the compound of the Formula I is used in a form of a hydrochloride, it is unnecessary to use hydrochloric acid in the above reaction.

(F) As described above, in this invention it is possible to convert a compound of the Formula I where R₂ is a hydrogen atom to another compound of the Formula I where $R_2$ is an alkyl group which may be substituted by a hydroxyl radical, or benzyl. This conversion may be performed according to the following reaction (F):

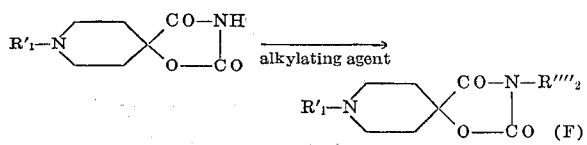

in which $R''''_2$ has the same meaning as $R_2$ except hydrogen and phenyl which may be substituted by a halogen atom and $R'_1$ is defined above.

The conversion is carried out by reacting a compound of the Formula I where $R_2$ is a hydrogen atom with a known alkylating agent. As such alkylating agent there are cited alkyl halides such as methyl iodide, ethyl iodide, propyl bromide, benzyl bromide and hydroxyethyl bromide, and dialkyl sulfates such as dimethyl sulfate and diethyl sulfate. In case an alkyl halide is used, the reaction is conducted in a solvent such as methyl Cellosolve in the presence of potassium hydroxide. In case a dialkyl sulfate is used, the reaction is carried out in a solvent such as acetone in the presence of potassium carbonate.

In this invention the intended compound of the Formula I can be obtained in a free state by treating the above compound of the Formula I in a salt form with a weak base such as aqueous ammonia, hydrogen sodium carbonate, potassium carbonate or sodium carbonate under cooling, the use of aqueous ammonia being preferred.

The base is formed into a non-toxic acid-addition salt together with an inorganic or organic acid, for instance, hydrochloric acid, phosphoric acid, sulfuric acid, citric acid, maleic acid or tartaric acid. The salt-exchange reaction of a salt of the intended compound of the Formula I may be conducted with a salt of other acid. Further, it is possible, if desired, to form a quaternary ammonium salt of the compound of the Formula I by employing a known reagent such as a quaternary ammonium salt of methylchloride, ethylchloride or phenylchloride.

1-oxa-3,8-diazaspiro[4,5]decan-2,4-diones of this invention and non-toxic salts thereof have pharmacological and neurotherapeutic properties useful for remedy for psychoses, and are valuable as psychotropic agent.

The typical instances of the compounds of this invention are as follows:

| Number | Formula and name | Melting point, °C.) |
|---|---|---|
| 1 | 3-methyl-8-[3-phenothiazinyl(10)propyl]-1-oxa-3,8-diazaspiro[4,5]decan-2,4-dione. | [1] 258–259 |
| 2 | 3 - methyl - 8 - [3 - {2 - chlorophenothiazinyl(10)}propyl] - 1 - oxa - 3,8 - diazaspirodecan-2,4-dione. | { 142–143<br>{ [1,2] 262–263 |
| 3 | 3-phenyl-8-[3-{2-chlorophenothiazinyl(10)}propyl]-1-oxa-3,8-diazaspiro[4,5]decan-2,4-dione. | { 150–151<br>{ [1,2] 253–255 |
| 4 | 3-benzyl-8-[3-{2-chlorophenothiazinyl(10)}propyl]-1-oxa-3,8-diazaspiro[4,5]decan-2,4-dione. | [1,2] 155 |
| 5 | 3-n-propyl-8-[3-{2-chlorophenothiazinyl(10)}propyl]-1-oxa-3,8-diazaspiro[4,5]decan-2,4-dione. | [1] 198–200 |

See footnote at end of table.

TABLE—Continued

| Number | Formula and name | Melting point, (° C.) |
|---|---|---|
| 6 | 3-(2-hydroxyethyl)-8-[3-{2-chlorophenothiazinyl(10)}propyl]-1-oxa-3,8-diazaspiro[4,5]decan-2,4-dione. | [1] 270–272 |
| 7 | 3-methyl-8-[3-{2-trifluoromethylphenothiazinyl(10)}propyl]-1-oxa-3,8-diazaspiro[4,5]decan-2,4-dione. | [1,2] 239–241 |
| 8 | 3-methyl-8-[3-{2-methoxyphenothiazinyl(10)}propyl]-1-oxa-3,8-diazaspiro[4,5]. | [1] 231–232 |
| 9 | 3-methyl-8-[3-{10,11-dihydro-5H-dibenz[b,f]azepinyl(5)}propyl]-1-oxa-3,8-diazaspiro[4,5]decan-2,4-dione. | [1,2] 255–257 |
| 10 | 3-methyl-8-[3-{5H-dibenz[b,f]azepinyl(5)}propyl]-1-oxa-3,8-diazaspiro[4,5]decan-2,4-dione. | [1,2] 218–219 |
| 11 | 3-phenyl-8-[3-(p-fluorobenzoyl)propyl]-1-oxa-3,8-diazaspiro[4,5]decan-2,4-dione. | { 180–182<br>{ [1,2] 287–290 |
| 12 | 3-p-chlorophenyl-8-[3-(p-fluorobenzoyl)propyl]-1-oxa-3,8-diazaspiro[4,5]decan-2,4-dione. | [1,2] 272–275 |
| 13 | 3-benzyl-8-[3-(p-fluorobenzoyl)propyl]-1-oxa-3,8-diazaspiro[4,5]decan-2,4-dione. | [1,2] 250–251 |
| 14 | 3-methyl-8-[3-(p-fluorobenzoyl)propyl]-1-oxa-3,8-diazaspiro[4,5]decan-2,4-dione. | [1,2] 274–275 |

See footnotes at end of table.

TABLE—Continued

| Number | Formula and name | Melting point, (° C.) |
|---|---|---|
| 15 | F—⟨⟩—COCH₂CH₂CH₂—N⟨piperidine⟩(CO—N—CH₂CH₂CH₃)(O—CO) <br> 3-n-propyl-8-[3-(p-fluorobenzoyl)propyl]-1-oxa-3,8-diazaspiro[4,5]decan-2,4-dione. | 1, 2 235–237 |
| 16 | Cl—⟨⟩—COCH₂CH₂—N⟨piperidine⟩(CO—N—⟨phenyl⟩)(O—CO) <br> 3-phenyl-8-[2-(p-chlorobenzoyl)ethyl]-1-oxa-3,8-diazaspiro[4,5]decan-2,4-dione. | 1 >300 |
| 17 | Cl—⟨⟩—COCH₂CH₂—N⟨piperidine⟩(CO—N—CH₂CH₂CH₃)(O—CO) <br> 3-n-propyl-8-[2-(p-chlorobenzoyl)ethyl]-1-oxa-3,8-diazaspiro[4,5]decan-2,4-dione. | 1, 2 214–215 |
| 18 | Cl—⟨⟩—COCH₂CH₂—N⟨piperidine⟩(CO—NH)(O—CO) <br> 8-p-chlorobenzoylethyl-1-oxa-3,8-diazaspiro[4,5]decan2,4-dione. | 1, 2 225 |
| 19 | ⟨⟩—CH₂—N⟨piperidine⟩(CO—N—⟨phenyl⟩)(O—CO) <br> 8-[2-p-chlorobenzoylethyl]-1-oxa-3,8[4,5]decan-2,4-dione. | { 184–186 <br> 292–293 |
| 20 | ⟨⟩—CH₂—N⟨piperidine⟩(CO—N—⟨⟩—Cl)(O—CO) <br> 3-p-chlorophenyl-8-benzyl-1-oxa-3,8-diazaspiro[4,5]decan-2,4-dione. | 180–128 |
| 21 | ⟨⟩—CH₂—N⟨piperidine⟩(CO—N—CH₂—⟨⟩)(O—CO) <br> 3,8-dibenzyl-1-oxa-3,8-diazaspiro[4,5]decan-2,4-dione. | { 113–115 <br> 1, 2 246–248 |
| 22 | ⟨⟩—CH₂—N⟨piperidine⟩(CO—N—CH₃)(O—CO) <br> 3-methyl-8-benzyl-1-oxa-3,8-diazaspiro[4,5]decan-2,4-dione. | 1, 2 266–268 |
| 23 | ⟨⟩—CH₂—N⟨piperidine⟩(CO—N—CH₂CH₂CH₃)(O—CO) <br> 3-n-propyl-8-benzyl-1-oxa-3,8-diazaspiro[4,5]decan-2,4-dione. | 101–103 |
| 24 | ⟨⟩—CH₂—N⟨piperidine⟩(CO—N—CH₂CH₃)(O—CO) <br> 3-ethyl-8-benzyl-1-oxa-3,8-diazaspiro[4,5]decan-2,4-dione. | 103–105 |
| 25 | ⟨⟩—CH₂—N⟨piperidine⟩(CO—N—CH₂CH₂OH)(O—CO) <br> 3-(2-hydroxyethyl)-8-benzyl-1-oxa-3,8-diazaspiro[4,5]decan-2,4-dione. | 127–128 |
| 26 | ⟨⟩—CH₂—N⟨piperidine⟩(CO—NH)(O—CO) <br> 8-benzyl-1-oxa-3,8-diazaspiro[4,5]decan-2,4-dione. | { 185–187 <br> 1, 2 291–293 |
| 27 | HOCH₂CH₂CH₂—N⟨piperidine⟩(CO—N—CH₃)(O—CO) <br> 3-methyl-8-(3-hydroxypropyl)-1-oxa-3,8-diazaspiro[4,5]decan-2,4-dione. | { 130–131 <br> 1, 2 250–252 |

See footnotes at end of table.

TABLE—Continued

| Number | Formula and name | Melting point, (° C.) |
|---|---|---|
| 28 | 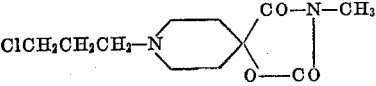<br>3-methyl-8-(3-chloropropyl)-1-oxa-3,8-diazaspiro[4,5]decan-2,4-dione. | 83–84 |
| 29 | 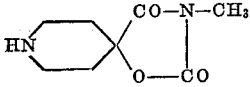<br>3-methyl-1-oxa-3,8-diazaspiro[4,5]decan-2,4-dione. | 113–114 |
| 30 | 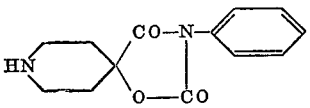<br>3-phenyl-1-oxa-3,8-diazaspiro[4,5]decan-2,4-dione. | 158–159 |
| 31 | 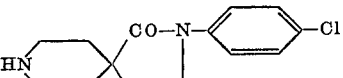<br>3-p-chlorophenyl-1-oxa-3,8-diazaspiro[4,5]decan-2,4-dione. | 168–169 |
| 32 | 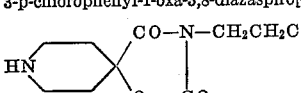<br>3-n-propyl-1-oxa-3,8-diazaspiro[4,5]decan-2,4-dione. | [1],[2] 155–157 |
| 33 | 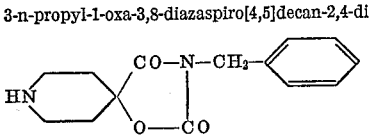<br>3-benzyl-1-oxa-3,8-diazaspiro[4,5]decan-2,4-dione. | [1] 202–204 |
| 34 | 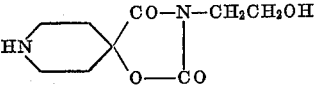<br>3-(2-hydroxyethyl)-1-oxa-3,8-diazaspiro[4,5]decan-2,4-dione. | [1] 206–702 |
| 35 | 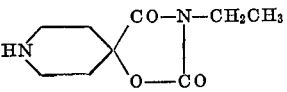<br>3-ethyl-1-oxa-3,8-diazaspiro[4,5]decan-2,4-dione | { 75–76<br> [1] 133–135 |

[1] Hydrochloride.
[2] Decomposition.

The compounds of this invention are useful as psycotropic agent with a very low toxicity.

With reference to the compound No. 2 among these compounds, the tests of pharmacological activity and toxicity were conducted. The test procedures and results are described below:

TEST PROCEDURES

Male dd-mice and male Wistar rats were subjected to experiments conducted to measure the activities and toxicity of the compound.

(1) Cataleptic activity

The experiments were conducted in accordance with the following procedures:

*In case of mice.*—The compound was intraperitoneally administered to a group of 5 mice and the cataleptic state appearing on the mice was measured at 30 minutes, 60 minutes, 120 minutes, 180 minutes and 24 hours respectively, and based on the point when the peak effect was attained, the dose-response curve was prepared in respect of the compound and the $ED_{50}$ value was calculated in accordance with Litchfield-Wilcoxon method.

*In case of rats.*—The compound was intraperitoneally administered to a group of 5 rats. Then, each rat was forcibly caused to assume such an unnatural posture that either of its left and right forelimbs was raised onto a stand of about 6 cm. height. When in this state the rat could maintain this state for a prescribed period of time (3 seconds) without any motion, it was determined that catalepsy was observed in the rat. The ratio of rats where catalepsy was observed to the whole group of 5 rats was expressed in terms of percentage and the value of cataleptic activity was calculated by defining the catalepsy-observed ratio of 50% as $ED_{50}$.

(2) Muscle relaxant activity

The experiments were conducted in accordance with the following procedures.

*In case mice.*—After the compound has been intraperitoneally administered to a group of 5 mice, these mice were separately put into a cylindrical wire-cage having a diameter of 21 cm. and a length of 60 cm. and rotating at a rate of 2 rotations per minute in the state where the wire-cage slants 60° to the horizontal direction. Based on the number of the mice which failed to hold on to the wire-cage and fell down in the lapse of time of 2 minutes, the $ED_{50}$ value in respect of each compound was calculated in accordance with conventional method.

*In case rats.*—After the compound has been intraperitoneally administered to a group of 5 rats, these rats were made hold on to the vertical screen separately, and number of rats failed to hold on to the vertical screen was measured at every 30 minutes for 6 hours respectively, and base on the points when the peak effect was attained, the dose response was prepared in respect of the compound and the $ED_{50}$ value was calculated in accordance with Lichfield-Wilcoxon method.

(3) Barbiturate-potentiating activity

The experiments were conducted in accordance with the following procedures:

The compound was intraperitoneally administered to a group of 5 mice. Thirty minutes later, a non-anesthetic dose (40 mg./kg.) of methylhexabital-Na was intraperitoneally administered to each of the mice. The time-duration between the disappearance of the righting reflex and its recovery was measured, and the extension of this time as compared with the case of administration of only methylhexabital-Na was investigated. The dose of the compound required for extending the time by 60 minutes on an average of 5 mice was defined as the $ED_{60}$ (min.) value of said compound.

(4) Prevention of methamphetamine-induced locomotor activity

The compound was administered to 3 mice, and 10 minutes later, methamphetamine was intraperitoneally administered to each of the mice in dose of 5 mg./kg. They were coincidentally put into a photocell cage where a light was scanning in a prescribed course. The frequency of light-interception by the mice was electrically recorded over a period of 10 minutes after 15 minutes from the administration of methamphetamine, and the recorded frequency was compared with that in the case of the mice to which had been administered methamphetamine alone. And, the lowering degree of the frequency was defined in terms of prevention (percent) and the $ED_{50}$ value was calculated based on a prevention of 50%.

(5) Acute lethal toxicity

In acute toxicity test, each group of 5 mice weighing 18–20 g. and 5 rats weighing 180–250 g. were (intraperitoneally or orally) administered a suspension of the compound in 1% gum arabic solution, and observation was made for 7 days.

TEST RESULTS

The results of the above tests are shown in Tables I, II, and III below. For comparison, the results of the similar tests made on the above mentioned conventional compound (chlorpromazine) which is known to possess the useful pharmacological activity are also shown in the tables.

TABLE I
[Mouse]

| Tested compound | Cataleptic activity (mg./kg.) | Muscle relaxant activity (mg./kg.) | Barbiturate-potentiating activity (mg./kg.) | Prevention of methamphetamine-induced activity (mg./kg.) |
|---|---|---|---|---|
| MT-300 [1] | 17.0 | >100 | 54.5 | 2.6 |
| Chloropromazine hydrochloride | 41.0 | 68.0 | 43.0 | 17.0 |

[1] See footnote at end of Table III.

TABLE II
[Rat]

| Tested compound | Cataleptic activity (mg./kg.) | Muscle relaxant activity (mg./kg.) |
|---|---|---|
| MT-300 [1] | 21.2 | >100 |
| Chloropromazine hydrochloride | 15.0 | 12.0 |

[1] See footnote at end of Table III.

TABLE III
[Toxicity]

| Tested compound | Mouse ($LD_{50}$ mg./kg.) | | Rat ($LD_{50}$ mg./kg.) |
|---|---|---|---|
| | P.o. | I.p. | P.o. |
| MT-300 [1] | 2,000 | >1,000 | >2,000 |
| Chloropromazine hydrochloride | 135 | 94 | 207–455 |

[1] 3-methyl-8-[3-{2-chlorophenothiazinyl(10)}propyl]-1-oxa-3,8-diazaspiro[4,5]decan-2,4-dione hydrochloride.

A clinical dosage of the compounds of this invention depends on disease syndrome, body weight, age and administration method, but it is, in general, in the range of 5–300 mg. per day, preferably in the range of 50–150 mg. per day.

The compounds of this invention can be prepared for use by dissolving them in a salt form under sterile conditions into water or in a physiologically compatible aqueous medium such as saline, and can be stored in ampoules for injection use. Further, there can be used in a unit dosage form as tablets or capsules for oral administration or optionally in combination with suitable adjuvants such as calcium carbonate, starch, lactose, talc, magnesium stearate, carboxymethyl cellulose and gum acasia. Still further, the compounds of this invention may be formed into aqueous alcohol, glycol or oil solutions or oil-water emulsions, for oral administration in the same manner as conventional medical substances are formed.

An example of formulations prepared by employing the compounds of this invention is as follows:

|  | G. |
|---|---|
| 3-methyl-8-[3-{2-chlorophenothiazinyl(10)}propyl]-1-oxa-3,8-diazaspiro[4,5]decan-2,4-dione hydrochloride | 25 |
| Lactose | 45 |
| Starch | 9.5 |
| Microcrystalline cellulose | 20 |
| Magnesium stearate | 0.5 |

The above materials are mixed together, granulated and tableted in accordance with the conventional method to give 1000 tablets, each of which weigh 100 mg.

Some embodiments of the preparation of the compounds of this invention will be described hereinbelow by referring to examples.

EXAMPLE 1

Preparation of 8-benzyl-3-phenyl-1-oxa-3,8-diazaspiro[4,5]decan-2,4-dione of the formula:

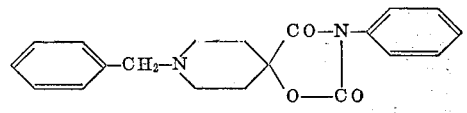

Into 40 ml. of anhydrous benzene were dissolved 8.6 g. of 1-benzyl-4-cyano-4-piperidinol, 9.52 g. of phenyl isocyanate and 1 ml. of triethylamine. The reaction was conducted at room temperature for 5 hours under stirring. The precipitated crystals were separated by filtration and recrystallized from benzene to obtain 11 g. of 8-benzyl-3-phenyl-4-phenylcabamoylimino-1-oxa-3,8-diazaspiro[4,5]decan-2-one as colorless needles melting at 200–202° C.

The so obtained compound (11 g.) was dissolved into a mixture of 30 ml. of concentrated hydrochloric acid and 70 ml. of ethanol and heated in a water bath under reflux for 2 hours. After cooling, the precipitated crystals were separated by filtration and recrystallized from glacial acetic acid to obtain 7.8 g. of the hydrochloride of the intended product as white crystals melting at 291–292° C. (decomposition). This hydrochloride was dissolved in water and the solution was made alkaline with ammonia. The precipitated crystals were separated by filtration and recrystallized from ethanol to obtain the intended product as colorless needles melting at 184–186° C.

EXAMPLE 2

Preparation of 3,8-dibenzyl-1-oxa-3,8-diazaspiro[4,5]decan-2,4-dione hydrochloride of the formula

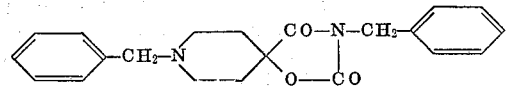

Into 100 ml. of anhydrous benzene were dissolved 21.6 g. of 1-benzyl-4-cyano-4-piperidinol, 26.6 g. of benzyl isocyanate and 2 ml. of triethylamine, and the reaction was performed for 3 hours at room temperature under stirring. The benzene was removed by distillation under reduced pressure. The removal of 1-benzyl-4-piperidone (boiling at 147–151° C. under 7 mm. Hg) contained in the residue by further distillation under pressure resulted in formation of 14.6 g. of 3,8-dibenzyl-4-benzylcarbomyl-imino-1-oxa-3,8-diazaspiro[4,5]decan-2-one as gummy residue. This compound was dissolved in a mixture of 20 ml. of concentrated hydrochloric acid and 50 ml. of ethanol and refluxed for one hour, and the precipitated crystals were separated by filtration. Recrystallization of the separated crystals from methanol gave 8.5 g. of the intended product as colorless needles melting at 246–248° C. (decomposition).

EXAMPLE 3

Preparation of 8-benzyl-3-methyl-1-oxa-3,8-diazaspiro[4,5]decan-2,4-dione hydrochloride of the formula:

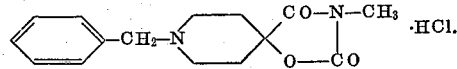

Into 100 ml. of anhydrous benzene were dissolved 21.6 g. of 1-benzyl-4-cyano-4-piperidinol, 11.4 g. of methyl isocyanate and 1 ml. of triethylamine, and the reaction was conducted at room temperature under stirring for 2 hours. The benzene was distilled off under reduced pressure, followed by removal of 1-benzyl-4-piperidone (boiling at 142–146° C. under 4 mm. Hg) by further distillation under reduced pressure. Thus, there was obtained 6 g. of 8-benzyl-3-methyl-4-methylcarbamoylimino-1-oxa-3,8-diazaspiro[4,5]decan-2-one as gummy residue. This compound was dissolved into a mixture of 15 ml. of concentrated hydrochloric acid and 30 ml. of ethanol and heated under reflux in a water bath for one hour. After cooling, the freshly precipitated crystals were separated by filtration and recrystallized from methanol to obtain 4.3 g. of the intended product as colorless needles melting at 266–268° C. (decomposition).

EXAMPLE 4

By conducting the reaction and treatments in a similar manner as in Example 1, there was obtained 8-benzyl-3-parachlorophenyl-1-oxa-3,8-diazaspiro[4,5]decan-2,4-dione (melting at 180–181° C.) of the formula:

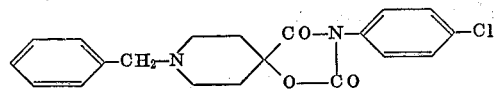

EXAMPLE 5

By conducting the reaction and treatments in a similar manner as in Example 3, there was obtained 8-benzyl-3-n-propyl-1-oxa-3,8-diazaspiro[4,5]decan-2,4-dione hydrochloride. This compound was made alkaline with ammonia and recrystallized from ethanol to obtain 8-benzyl-3-n-propyl-1-oxa-3,8-diaspiro[4,5]decan-2,4-dione (melting at 101–103° C.) of the formula:

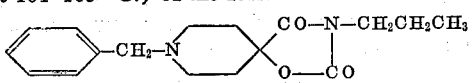

EXAMPLE 6

Preparation of 8-benzyl-1-oxa-3,8-diazaspiro[4,5]decan-2,4-dione of the formula

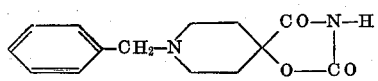

(a) To a solution of 23.7 g. of 1-benzyl-4-cyano-4-piperidinol in 100 ml. of dry benzene were added under stirring at room temperature an excess of acetyl isocyanate in a petroleum ether solution and a catalytic amount of triethylamine. The reaction system was allowed to stand at room temperature overnight, and then the precipitated crystals were separated by filtration. Concentrated hydrochloric acid was added to a solution of the so obtained crystals in ethanol, and the mixture was heated under reflux for several minutes. Then, the solvent was removed by distillation and the remaining crystals were recrystallized from diluted ethanol to obtain 24 g. of the hydrochloride of the intended product melting at 291–293° C.

Then, this hydrochloride was treated with ammonia to obtain 20 g. of the intended product melting at 185–187° C.

(b) Benzoylisocyanate (63.8 g.) was added at room temperature under stirring to a solution of 46.5 g. of 1-benzyl-4-cyano-4-piperidinol in 300 ml. of dry benzene, followed by addition of a catalytic amount of triethylamine. The system was allowed to stand at room temperature overnight, and then the precipitated crystals were separated by filtration. The so obtained crystals were hydrolyzed in the same manner as described in (a) by employing hydrochloric acid to obtain 52 g. of the hydrochloride of the intended product.

EXAMPLE 7

Preparation of 3-phenyl-1-oxa-3,8-diazaspiro[4,5]decan-2,4-dione of the formula:

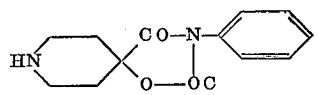

Into 60 ml. of glacial acetic acid were added 8.1 g. of 8-benzyl-3-phenyl-1-oxa-3,8-diazaspiro[4,5]decan-2,4-dione and 1 g. of 10% palladium-carbon. The reduction was conducted at an elevated temperature of 50 to 80° C. under atmospheric pressure. After one hour's reduction the theoretical amount of $H_2$ gas was absorbed. After cooling, the palladium-carbon catalyst was removed by filtration and the glacial acetic acid used as solvent was distilled off under reduced pressure. The residual crystals were dissolved into water and the solution was made alkaline with ammonia. The precipitated crystals were separated by filtration and recrystallized from ethanol to obtain 5.1 g. of the intended product as colorless needles melting at 158–159° C.

EXAMPLE 8

By conducting the reaction and treatments in a similar manner as in Example 7 with the use of the dione obtained in Example 5, there was obtained 3-p-chlorophenyl-1-oxa-3,8-diazaspiro[4,5]decan-2,4-dione hydrochloride having a melting point 168–169° C. of the formula:

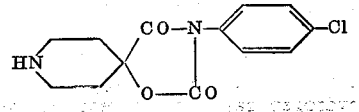

EXAMPLE 9

Preparation of 3 - methyl - 1 - oxa-3,8-diazaspiro[4,5]decan-2,4-dione of the formula:

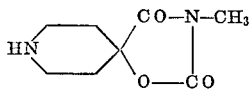

Into 80 ml. of glacial acetic acid were added 9.3 g. of 8 - benzyl - 3 - methyl - 1 - oxa - 3,8 - diazaspiro-[4,5]decan-2,4-dione and 1 g. of 10% palladium-carbon, and the reduction was carried out at elevated temperatures of 50–80° C. under atmospheric pressure. After one hour's reduction the theoritical amount of H₂ gas was absorbed. After cooling, the catalyst was removed by filtration and the glacial acetic acid used as solvent was distilled off under reduced pressure. The residual crystals were dissolved into water and the solution was made alkaline with ammonia. The precipitated crystals were recrystallized from benzene to obtain 6.5 g. of the intended product as colorless needles melting at 113–114° C.

EXAMPLE 10

Preparation of 3-n-propyl - 1 - oxa - 3,8 - diazaspiro-[4,5]decan-2,4-dione hydrochloride of the formula

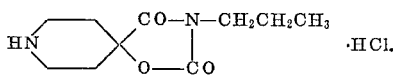

To 100 ml. of ethanol were added 12 g. of 8-benzyl-3-n-propyl - 1 - oxa - 3,8 - diazaspiro[4,5]decan-2,4-dione and 1 g. of 10% palladium-carbon, and the reduction was conducted at an elevated temperature of 50–80° C. under atmospheric pressure. After 2 hours' reduction the theoritical amount of H₂ gas was absorbed. After cooling, the palladium-carbon catalyst was removed by filtration and the ethanol used as solvent was distilled off under reduced pressure. The residual oily substance was dissolved into ether and alcoholic hydrochloric acid was added to the solution. The precipitated crystals were recrystallized from a mixture of ethanol and ether to obtain 8 g. of the intended product as colorless scalelike crystals melting at 155–157° C. (decomposition).

EXAMPLE 11

Preparation of 3-benzyl - 1 - oxa - 3,8 - diazaspiro-[4,5]decan-2,4-dione hydrochloride of the formula:

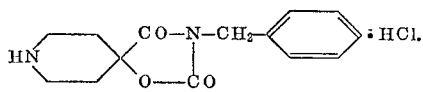

Into 80 ml. of glacial acetic acid were added 8 g. of 3,8 - dibenzyl - 1 - oxa - 3,8 - diazaspiro[4,5]decan-2,4-dione and 1 g. of 10% palladium-carbon, and the reduction was performed at an elevated temperature of 50–80° C. under atmospheric pressure. After 2 hours' reduction the theoritical amount of H₂ gas was absorbed. After cooling, the palladium-carbon catalyst was removed by filtration and the glacial acetic acid used as solvent was distilled off under reduced pressure. The residual crystals were dissolved into water and the solution was made alkaline with ammonia. The precipitated oily material was extracted with chloroform, washed with water and dried with sodium sulfate, followed by removal of the chlorform by distillation to obtain 5.4 g. of an oily substance. This oily substance was dissolved into ether, and alcoholic hydrochloric acid was added thereto. The precipitated crystals were recrystallized from methanol to obtain 5.0 g. of the intended product as colorless needles melting at 202–204° C. (decomposition).

EXAMPLE 12

Preparation of 3-methyl - 8 - (3-hydroxypropyl)-1-oxa-3,8-diazaspiro[4,5]decan-2,4-dione of the formula:

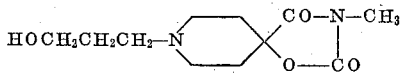

Into 80 ml. of isopropylacetone were dissolved 3.68 g. of 3-methyl - 1 - oxa - 3,8 - diazaspiro[4,5]decan-2,4-dione and 1.80 g. of 3-chloro-1-propanol, followed by addition of 2.1 g. of anhydrous potassium carbonate and 3.0 g. of sodium iodide. The system was heated under reflux for 20 hours with stirring, followed by filtration and removal of the solvent from the filtrate by distillation. The residue was washed with ether and recrystallized from isopropyl alcohol to obtain 3.2 g. of the intended product as colorless needles melting at 130–131° C.

EXAMPLE 13

Preparation of 3-methyl - 8 - (3-chloropropyl)-1-oxa-3,8-diazaspiro[4,5]decan-2,4-dione of the formula:

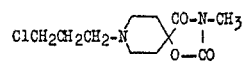

To a solution of 2.75 g. of 3-methyl - 1 - oxa-3,8-diazaspiro[4,5]decan-2,4-dione and 2.35 g. of 1-bromo-3-chloropropane in 60 ml. of methylethylketone was added 1.05 g. anhydrous potassium carbonate. The system was heated under reflux for 12 hours with stirring, followed by filtration and removal of the solvent from the filtrate by distillation. The residue was mixed with ether, and a portion insoluble in ether was removed. The ether layer was washed with a small amount of water and dried with magnesium sulfate. After concentration of the solvent, the system was allowed to be cooled. The precipitated crystals were recrystallized from ether to obtain 2.7 g. of the intended product as colorless prisms melting at 83–84° C.

EXAMPLE 14

Preparation of 3-phenyl - 8 - [3-(p-fluorobenzyl)propyl] - 1 - oxa - 3,8 - diazaspiro[4,5]decan - 2,4 - dione hydrochloride of the formula:

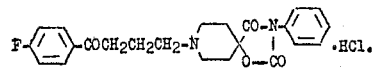

Into 25 ml. of anhydrous xylene were dissolved 2 g. of 3-(p-fluorobenzoyl)-propylchloride, 2.5 g. of 3-phenyl-1-oxa-3,8-diazaspiro[4,5]decan-2,4-dione and 1.1 g. of triethylamine, and the solution was heated under reflux in an oil bath for 5 hours. After cooling, the precipitated triethylamine hydrochloride was removed by filtration, and the xylene layer was shaken together with concentrated hydrochloric acid. The hydrochloric acid layer was made alkaline with ammonia, and the precipitated gummy material was extracted with ethyl acetate, washed with water and dried with magnesium sulfate, followed by distillation under reduced pressure. The residual gummy substance was dissolved into ethanol, and alcoholic hydrochloric acid was added to the solution. The precipitated crystals were recrystallized from methanol to obtain 1.8 g. of the intended product as colorless needles melting at 287–290° C. (decomposition).

EXAMPLE 15

By conducting the reaction and treatments in a similar manner as in Example 14 with the use of a dione which had a p-chlorophenyl substituent in the 3-position, there was obtained 3 - p - chlorophenyl-8-[3-(p-fluorobenzoyl)

propyl]-1-oxa-3,8-diazaspiro[4,5]decan-2,4-dione hydrochloride melting at 272–275° C. (decomposition) and represented by the formula:

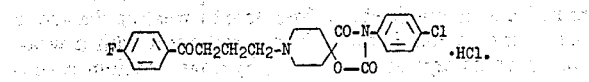

EXAMPLE 16

Preparation of 3-benzyl-8-[3-(p-fluorobenzoyl)propyl]-1-oxa-3,8-diazaspiro[4,5]decan-2,4-dione hydrochloride of the formula:

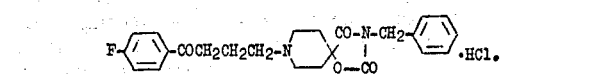

Into 10 ml. of anhydrous xylene were dissolved 1.6 g. of 3-(p-fluorobenzoyl)propyl chloride, 2.1 g. of 3-benzyl-1-oxa-3,8-diazaspiro[4,5]decan-2,4-dione and 0.9 g. of triethylamine, and the solution was heated under reflux in an oil bath for 5 hours, followed by similar procedures as described in Example 15. Thus, there was obtained 1.6 g. of the intended product as colorless needles melting at 250–251° C. (decomposition) after recrystallization from methanol.

EXAMPLE 17

Preparation of 3-methyl-8-[3-(p-fluorobenzoyl)propyl]-1-oxa-3,8-diazaspiro[4,5]decan-2,4-dione hydrochloride of the formula:

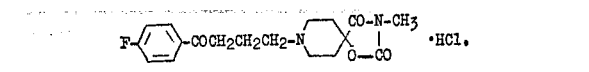

Into 20 ml. of anhydrous xylene were dissolved 1.8 g. of 3-(p-fluorobenzoyl)propyl chloride, 1.65 g. of 3-methyl-1-oxa-3,8-diazaspiro[4,5]decan-2,4-dione and 1 g. of triethylamine, and the solution was heated under reflux for 6 hours. After cooling, the precipitated triethylamine hydrochloride was removed by filtration and the xylene layer was shaken together with concentrated hydrochloric acid. The hydrochloric acid layer was concentrated under reduced pressure. The residual cystals were recrystallized from methanol to obtain 1.4 g. of the intended produce as colorless needles melting at 274–275° C. (decomposition).

EXAMPLE 18

Preparation of 3-n-propyl-8-[3-(p-fluorobenzoyl)propyl]-1-oxa-3,8-diazaspiro[4,5]decan-2,4-dione hydrochloride of the formula:

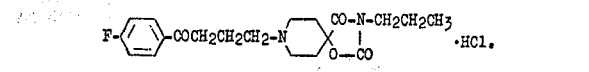

Into 15 ml. of anhydrous xylene were dissolved 2 g. of 3-(p-fluorobenzoyl)propyl chloride, 2.1 g. of 3-n-propyl-1-oxa-3,8-diazaspiro[4,5]decan-2,4-dione and 1.1 g. of trimethylamine, and the solution was heated under reflux in an oil bath for 7 hours. After cooling, similar procedures as described in Example 17 were conducted. Thus, there was obtained 1.9 g. of the intended product as colorless needles melting at 235–237° C. (decomposition).

EXAMPLE 19

Preparation of 3-phenyl-8-[3-{2-chlorophenothiazinyl(10)}propyl]-1-oxa-3,8-diazaspiro[4,5]decan-2,4-dione hydrochloride of the formula:

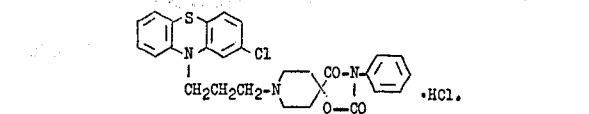

Into 20 ml. of anhydrous xylene were dissolved 3.1 g. of 3-[2-chlorophenothiazinyl(10)]-1-chloropropane, 2.5 g. of 3-phenyl-1-oxa-3,8-diazaspiro[4,5]decan-2,4-dione and 1.1 g. of triethylamine, and the solution was heated under reflux in an oil bath for 8 hours. After cooling, the precipitated triethylamine hydrochloride was removed by filtration and the xylene layer was shaken together with concentrated hydrochloric acid. The hydrochloric acid layer was made alkaline, and the precipitated was washed with water and dissolved in ether. Then, alcoholic hydrochloric acid was added to the ether solution. The precipitated crystals were recrystallized from methanol to obtain 2.0 g. of colorless small needles melting at 253–255° C. (decomposition).

EXAMPLE 20

Preparation of 3-methyl-8-[3-{2-chlorophenothiazinyl(10)}propyl]-1-oxa-3,8-diazaspiro[4,5]decan-2,4-dione hydrochloride of the formula:

(a) A solution of 3.1 g. of 3-[2-chlorophenothiazinyl(10)]-1-chloropropane, 1.9 g. of 3-methyl-1-oxa-3,8-diazaspiro[4,5]decan-2,4-dione and 1.1 g. of triethylamine in 20 ml. of anhydrous xylene was heated under reflux in an oil bath for 8 hours, followed by cooling with ice and addition of 30 ml. of 10% hydrochloric acid. The resulting crystals were separated by filtration, washed with water and then recrystallized from methanol to obtain 1.8 g. of the intended product as colorless small needles melting at 262–263° C. (decomposition).

(b) 3-[2-chlorophenothiazinyl(10)]-1-chloropropane (3.1 g.), 3-methyl-1-oxa-3,8-diazaspiro[4,5]decan-2,4-dione (1.84 g.), potassium carbonate (1.5 g.) and potassium iodide (0.5 g.) were refluxed in 50 ml. of methylethylketone for 8 hours. After the completion of the reaction, the insoluble matter was removed by filtration and the filtrate was condensed. The resultant residue was dissolved into 10 ml. of ethanol and an excess of concentrated hydrochloric acid was added to the solution to precipitate crystals. The so precipitated crystals were washed with water and with ethanol, and then recrystallized from methanol to obtain 3.5 g. of the intended product melting at 262–263° C. (decomposition).

Then, the intended product obtained above was treated with ammonia to give the base thereof melting at 142–143° C.

EXAMPLE 21

The following compounds were obtained in a similar manner as described in Example 20: 3-methyl-8-[3-phenothiazinyl(10)propyl]-1-oxa-3,8-diazaspiro[4,5]decan-2,4-dione hydrochloride (melting at 258–259° C.) of the formula:

3-benzyl-8-[3-{2-chlorophenothiazinyl(10)}propyl]-1-oxa-3,8-diazaspiro[4,5]decan-2,4-dione hydrochloride (decomposing at 155° C.) of the formula:

3-n-propyl-8-[3-{2-chlorophenothiazinyl(10)}propyl]-1-oxa-3,8-diazaspiro[4,5]decan-2,4-dione hydrochloride (melting at 198–200° C.) of the formula:

3-(2-hydroxyethyl)-8-[3-{2-chlorophenothiazinyl(10)}propyl]-1-oxa-3,8-diazaspiro[4,5]decan-2,4- dione hydrochloride (melting at 270–272° C.) of the formula:

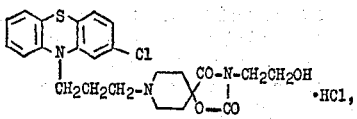

3 - methyl - 8 - [3-{2-trifluoromethylphenothiazinyl(10)} propyl] - 1 - oxa - 3,8 - diazaspiro[4,5]decan - 2,4 - dione hydrochloride (decomposing at 239–241° C.) of the formula:

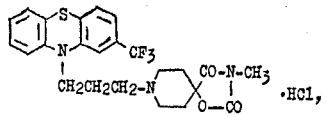

and 3 - methyl - 8 - [3 - {2 - methoxyphenothiazinyl(10)} propyl] - 1 - oxa - 3,8 - diazaspiro[4,5]decan - 2,4 - dione hydrochloride (melting at 231–232° C.) of the formula:

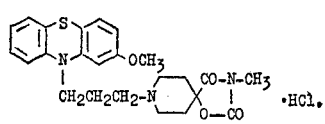

EXAMPLE 22

Preparation of 3-phenyl-8-[2-(p-chlorobenzoyl)ethyl]-1-oxa-3,8-diazaspiro[4,5]decan-2,4-dione hydrochloride of the formula:

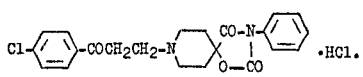

A solution of 2 g. of 2-(p-chlorobenzoyl)ethylchloride, 2.5 g. of 3-phenyl-1-oxa-3,8-diazaspiro[4,5]decan-2,4-dione and 1.1 g. of triethylamine in 30 ml. of anhydrous xylene was heated under reflux in an oil bath for 6 hours. After cooling, the precipitated triethylamine hydrochloride was removed by filtration, and the xylene layer was shaken with concentrated hydrochloric acid. The precipitated crystals were separated by filtration and recrystallized from methanol to obtain 3.2 g. of the intended product as colorless scalelike crystals having a melting point above 300° C.

EXAMPLE 23

In a similar manner as described in Example 22 there was obtained 3-n-propyl-8-[2-(p-chlorobenzoyl)ethyl]-1-oxa - 3,8 - diazaspiro[4,5]decan - 2,4-dione hydrochloride having a melting point of 214–215° C. (decomposition) and represented by the formula:

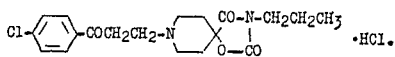

EXAMPLE 24

Preparation of 3-methyl-8-[3-{2-chlorophenothiazinyl (10)}propyl] - 1 - oxa-3,8-diazaspiro[4,5]decan-2,4-dione hydrochloride of the formula:

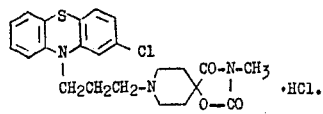

To a solution of 3.50 g. of 2-chlorophenothiazine in 20 ml. of dimethylformamide was added 0.5 g. of about 50% sodium hydride-mineral oil suspension. The mixture was heated under nitrogen gas stream at 50–60° C. with stirring for two hours, and then 3.90 g. of 8-chloropropyl - 3 - methyl - 1 - oxa-3,8-diazaspiro[4,5]decan-2,4-dione in 20 ml. of dimethyl formamide was added to the above mixture. Then, the system was heated at 40–50° C. under stirring for 5 hours, followed by addition of 2 ml. of anhydrous ethanol. After removal of the solvent by distillation, the residue was extracted with ether. The ether layer was shaken together with 10% hydrochloric acid, followed by cooling. The precipitated crystals were separated by filtration and washed with ether and then with water. After recrystallization of the crystals from methanol, there was obtained 4.1 g. of the intended product as colorless needles melting at 262–263° C. (decomposition).

EXAMPLE 25

Preparation of 8 - [3 - {10,11 - dihydro-5H-dibenz[b,f] azepinyl(5)}propyl] - 3-methyl-1-oxa-3,8-diazaspiro[4,5] decan-2,4-dione hydrochloride of the formula:

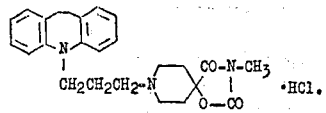

A mixture of 3.0 g. of 3-[10,11-dihydro-5H-dibenz-[b,f]azepinyl(5)]-1-chloropropane, 5.1 g. of 3-methyl-1-oxa-3,8-diazaspiro[4,5]decan-2,4-dione and 30 ml. of absolute xylene was heated under reflux for 14 hours. After cooling, 40 ml. of 10% hydrochloric acid was added, and the precipiated crystals were separated by filtration, washed with water and with ether, and then recrystallized from methanol to obtain 2.0 g. of intended product as colorless powder melting at 255–257° C. (decomposition).

EXAMPLE 26

Preparation of 8-[3-{5H-dibenz[b,f]azepinyl(5)}propyl] - 3 - methyl-1-oxa-3,8-diazaspiro[4,5]decan-2,4-dione hydrochloride of the formula:

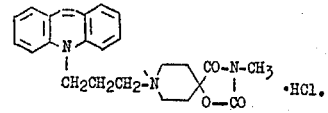

A mixture of 3.35 g. of 3-[5H-dibenz[b,f]azepinyl (5)]-1-chloropropane, 2.3 g. of 3-methyl-1-oxa-3,8-diazaspiro[4,5]decan-2,4-dione, 3.8 g. of triethylamine and 30 ml. of anhydrous xylene was heated under reflux for 14 hours. After cooling, 40 ml. of 10% hydrochloric acid was added to the system and the precipitated crystals were removed by filtration. The hydrochloric acid layer was washed with ether, made alkaline with ammonia, extracted with chloroform and washed with water, followed by drying with potassium carbonate and removal of the solvent by distillation. The residue was dissolved into a small amount of benzene and the resultant solution was subjected to column chromatography using 20 g. of silica gel (eluting agent being a 4:1 mixture of benzene and acetone). The eluted liquor was concentrated and the residue was converted to a form of a hydrochloride salt with the use of alcoholic hydrochloric acid, followed by removal of the alcohol by distillation. The residue was recrystallized from isopropanol to obtain 2.8 g. of the intended product as yellowish green powder melting at 218–219° C. (decomposition).

EXAMPLE 27

Preparation of 3-methyl-8-[3-{2-chlorophenothiazinyl (10)}propyl]-1-oxa-3,8 - diazaspiro[4,5]decan-2,4-dione of the formula:

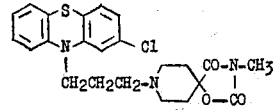

A mixture of 2.1 g. of 2-chlorophenothiazinyl-10-carboxylic acid chloride and 1.9 g. of 8-(3-hydroxypropyl)-3-methyl-1-oxa-3,8 - diazaspiro[4,5]decan-2,4-dione obtained in Example 12 was heated in 40 ml. of isopropyl-acetone under reflux for 20 hours with stirring. The so formed 8-(3-hydroxypropyl)-3-methyl-1-oxa-3,8-diazaspiro[4,5]decan-2,4-dione hydrochloride was filtered and the filtrate was concentrated by distillation. Then, the residue was extracted with ether, and the ether solution was further extracted with 10% hydrochloric acid. Then, the water layer was made alkaline with ammonia and extracted with chloroform. The residue was dried with sodium sulfate and recrystallized from ethanol to obtain 1.6 g. of 3-methyl-8-[3-{2-chlorophenothiazinyl(10)}carbonyloxy)-propyl] - 1-oxa - 3,8-diazaspiro[4,5]decan-2,4-dione of the formula:

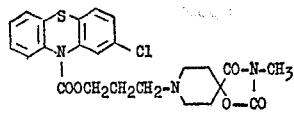

as colorless needles melting at 126.5–127° C.

The so obtained compound (1.4 g.) was heated at 190–200° C. under a reduced pressure of 1.0–1.2 mm. Hg in the presence of 0.2 g. of Cu powder. After cooling, the reaction mixture was extracted with chloroform, followed by removal of the copper by filtration, and the solvent was removed from the filtrate by distillation. The residue was dissolved in ether, and condensation of the solution resulted in precipitation of crystals, which were then recrystallized from ethylacetate to obtain 0.9 g. of the intended product as faintly yellow prisms melting 142–143° C.

EXAMPLE 28

Preparation of 8-[2-(p-chlorobenzoyl)ethyl]-3-propyl-1-oxa-3,8-diazaspiro[4,5]decan - 2,4-dione hydrochloride of the formula:

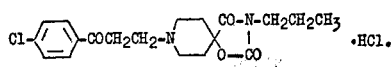

p-Chloroacetophenone (1.54 g.), 3-n-propyl-1-oxa-3,8-diazaspiro[4,5]decan-2,4-dione hydrochloride (2.49 g.) and paraformaldehyde (2.7 g.) were refluxed in 50% diluted ethanol for about 10 hours. After cooling, the precipitated crystals were separated by filtration and recrystallized from methanol to obtain 2.4 g. of the intended product as colorless scalelike crystals melting at 214–215° C. (decomposition).

EXAMPLE 29

In a similar manner as described in Example 28 there were obtained 8-[2-(p-chlorobenzoyl)ethyl]-1-oxa-3,8-diazaspiro[4,5]decan-2,4-dione hydrochloride melting at 225° C. (decomposition) and 3-phenyl-8-[2-(p-chlorobenzoyl)ethyl]-1-oxa-3,8 - diazaspiro[4,5]decan-2,4-dione hydrochloride melting at above 300° C. These compounds are represented by the formulae, respectively;

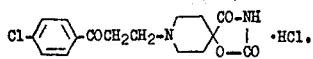

and

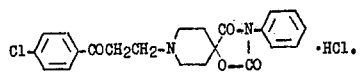

EXAMPLE 30

Preparation of 3-methyl-8-benzyl-1-oxa-3,8-diazaspiro [4,5]decan-2,4-dione of the formula:

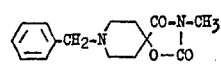

Into 35 ml. of acetone were suspended 8.9 g. of 8-benzyl-1-oxa-3,8-diazaspiro[4,5]decan-2,4-dione and 10 g. of potassium carbonate, followed by 2 hours' agitation. To the suspension, 3.8 g. of dimethyl sulfate was added dropwise over a period of 20 minutes while maintaining the temperature below 50° C., followed by 2 hours' agitation. The precipitated inorganic matter was removed by filtration and the filtrate was condensed. The residue was extracted with hot benzene. After distillation of the benzene, the residue was recrystallized from ethanol to obtain 6.12 g. of the intended product melting at 99–101° C.

EXAMPLE 31

In a similar manner as described in Example 30 with the use of diethyl sulfate there was obtained 8-benzyl-3-ethyl-1-oxa-3,8-diazaspiro[4,5]decan-2,4-dione melting at 103–105° C.

EXAMPLE 32

Preparation of 8-benzyl-3-n-propyl-1-oxa-3,8-diazaspiro[4,5]decan-2,4-dione of the formula:

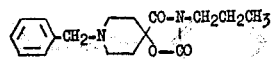

8 - benzyl-1-oxa-3,8-diazaspiro[4,5]decan-2,4-dione (13 g.) and potassium hydroxide (3.1 g.) were heated under reflux in methyl Cellosolve. Then, 8.5 g. of n-propyl iodide was added dropwise to the system over a period of 10 minutes, followed by refluxing for 2 hours. After cooling, the precipitated crystals were separated by filtration and recrystallized from ethanol to obtain 12 g. of the intended product as colorless needles melting at 101–103° C.

EXAMPLE 33

In a similar manner as described in Example 32 with the use of hydroxyethylchloride and benzylchloride there were prepared 8-benzyl-3-(2-hydroxyethyl)-1-oxa-3,8-diazaspiro[4,5]decan-2,4 dione melting at 127–128° C. and 3,8-dibenzyl-1-oxa-3,8-diazaspiro[4,5]decan-2,4-dione melting at 113–115° C. represented by the formula, respectively;

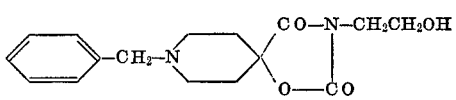

and

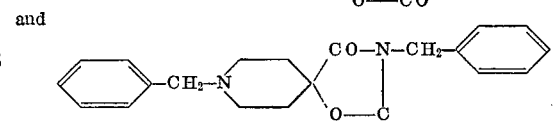

What we claim is:

1. An 8-[3-phenothiazinyl(10)propyl]-1-oxa-3,8-diazaspiro[4,5]decan-2,4-dione derivative of the following formula and a pharmaceutically acceptable non-toxic salt thereof:

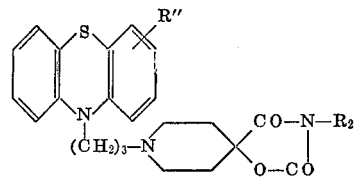

wherein R″ is a member selected from the group consisting of hydrogen, halogen, trifluoromethyl and alkoxy having 1 to 4 carbon atoms, and $R_2$ is a member selected from the group consisting of hydrogen, phenyl, benzyl, alkyl having 1 to 4 carbon atoms, and hydroxyl-substituted alkyl of 1 to 4 carbon atoms.

2. The dione derivative or non-toxic salt thereof of claim 1, wherein said dione derivative is 3-methyl-8-[3-phenothiazinyl(10)propyl] - 1 - oxa - 3,8-diazaspiro[4,5] decan-2,4-dione or a pharmaceutically acceptable non-toxic salt thereof.

3. The dione derivative or non-toxic salt thereof of claim 1, wherein said dione derivative is 3-methyl-8-[3-{2-chlorophenothiazinyl(10)}propyl] - 1-oxa-3,8-diazaspiro-[4,5]decan-2,4-dione or a pharmaceutically acceptable non-toxic salt thereof.

4. The dione derivative or non-toxic salt thereof of claim 1, wherein said dione derivative is 3-phenyl-8-[3-{2-chlorophenothiazinyl(10)}propyl] - 1-oxa-3,8-diazaspiro-[4,5]decan-2,4-dione or a pharmaceutically acceptable non-toxic salt thereof.

5. The dione derivative or non-toxic salt thereof of claim 1, wherein said dione derivative is 3-benzyl-8-[3-{2-chlorophenothiazinyl(10)}propyl] - 1-oxa-3,8-diazaspiro-

[4,5]decan-2,4-dione or a pharmaceutically acceptable non-toxic salt thereof.

6. The dione derivative or non-toxic salt thereof of claim 1, wherein said dione derivative is 3-n-propyl-8-[3-{2-chlorophenothiazinyl(10)}propyl] - 1-oxa-3,8-diazaspiro[4,5]decan-2,4-dione or a pharmaceutically acceptable non-toxic salt thereof.

7. The dione derivative or non-toxic salt thereof of claim 1, wherein said dione derivative is 2-(2-hydroxyethyl) - 8 - [3-{2-chlorophenothiazinyl(10)}propyl]-1-oxa-3,8-diazaspiro[4,5]decan-2,4-dione or a pharmaceutically acceptable non-toxic salt thereof.

8. The dione derivative or non-toxic salt thereof of claim 1, wherein said dione derivative is 3-methyl-8-[3-{2-trifluoromethylphenothiazinyl(10)}propyl] - 1-oxa-3,8-diazaspiro[4,5]decan-2,4-dione or a pharmaceutically acceptable non-toxic salt thereof.

9. The dione derivative or non-toxic salt thereof of claim 1, wherein said dione derivative is 3-methyl-8-[3-{2-methoxy-phenothiazinyl(10)}propyl] - 1-oxa-3,8-diazaspiro[4,5]decan-2,4-dione or a pharmaceutically acceptable non-toxic salt thereof.

References Cited

UNITED STATES PATENTS 3,359,265   12/1967   Jucker et al. _____ 260—243

HENRY R. JILES, Primary Examiner

H. I. MOATZ, Assistant Examiner

U.S. Cl. X.R.

260—294 A, 294.3 C; 424—247, 294, 267